Figure 1:
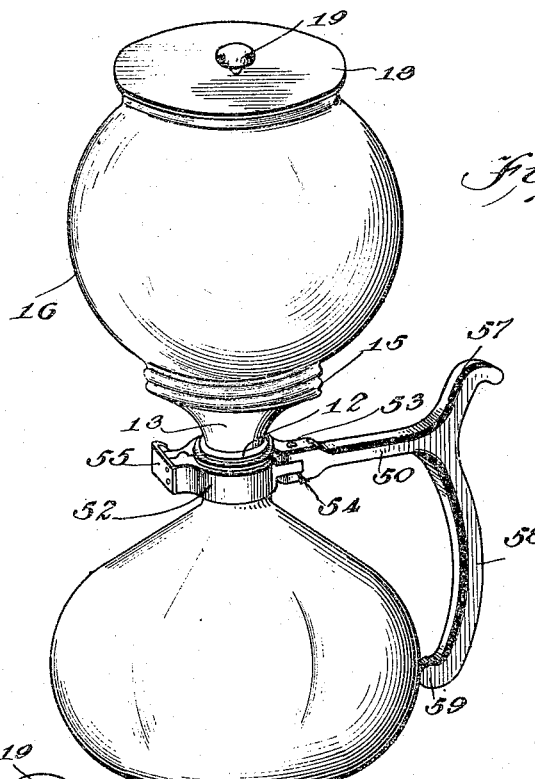

Dec. 13, 1927.

F. B. PRICE

COFFEE PERCOLATOR

Filed Nov. 12, 1925

1,652,955

INVENTOR
F. B. Price,
BY
ATTORNEYS

Patented Dec. 13, 1927.

1,652,955

UNITED STATES PATENT OFFICE.

FREEMAN BAMBOROUGH PRICE, OF BUTTE, MONTANA.

COFFEE PERCOLATOR.

Application filed November 12, 1925. Serial No. 68,664.

This invention relates to percolators for coffee and has for its object the provision of a device in which a glass pot has a reduced upper end into which is inserted a funnel having an enlarged threaded end and its upper end disposed externally of the pot, and to which is adapted to be separately or integrally connected, a glass bowl carrying at the juncture between the enlargement on the stem and the bowl, a glass or non-metal nut for maintaining a non-metal screen in position at this point, the bowl stem and pot being constructed in such a manner and of such materials that no metal parts will come in contact with the fluid in either the bowl or the pot.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claim.

In the drawings:—

Figure 2:
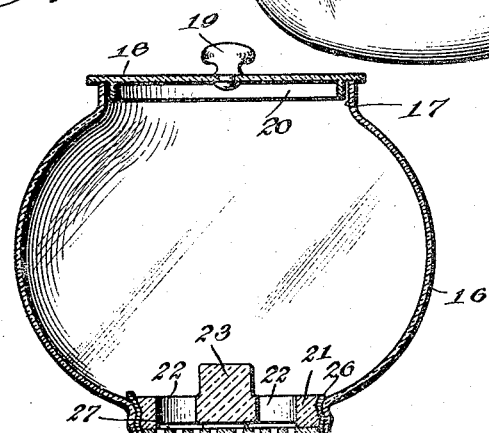
Figure 3:
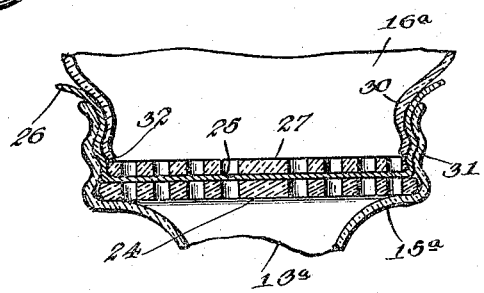
Figure 4:
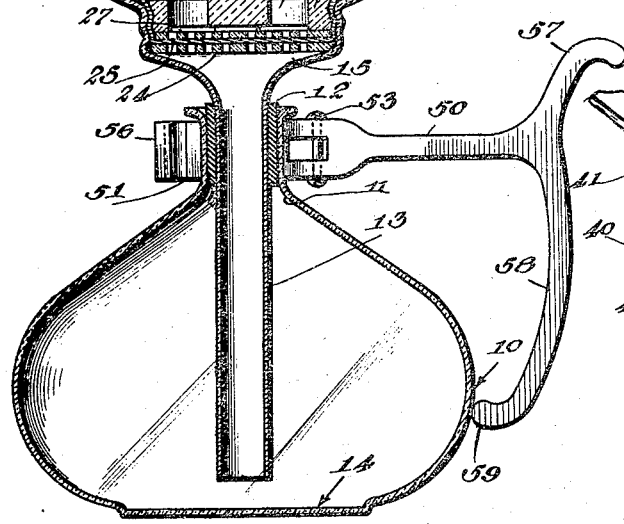
Figure 4:
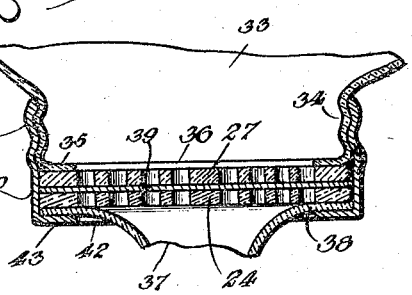

Figure 1 is a view in perspective of a percolator constructed according to the principles of my invention, Figure 2 is a vertical section of the percolator shown in Figure 1, Figure 3 is a fragmentary vertical section showing a modified form of the percolator, and Figure 4 is a fragmentary vertical section of another modified form of the invention.

Referring more particularly to the drawings. 10 designates a pot formed of glass and of that type of glass which will withstand a flame so that same will not be readily fracture when exposed to heat. The upper end of the pot 10 is reduced to provide a neck 11. In the neck is fitted a rubber or cork gasket 12.

A stem 13 formed of glass is spaced from the bottom 14 of the pot 10 while its upper end projects beyond the gasket 12 and is provided with a threaded enlargement 15 to form a cup-shaped member.

Above the cup-shaped member, as shown in Figures 1 and 2, is formed an integral glass bowl 16. The upper end of the bowl, has an open end 17 which is closed by a cover 18. The cover has a knob 19 whereby the same may be readily removed from the bowl 16. A depending flange 20 extends from the inner face of the cover 18 and aids in retaining said cover from displacement from the bowl.

A glass or non-metal nut 21 is threaded into the threaded cup-shaped member 15 and is provided with openings 22, and a cross piece 23 formed integrally with the nut and located between the openings 22. The threading as just described is of the beveled type so that the parts will be drawn up tight. This cross piece extends above the nut and affords a finger grasp whereby the nut may be rotated and screwed into position. A perforated glass disc 24 is seated within the cup-shaped member 15 upon which is placed a flannel screen 25 having its side walls 26 located between the nut 21 and the threaded side walls of the cup-shaped member 15. Above the screen 25 is a second perforated disc 27 seated on the said screen and held in place by the nut 21. The disposition of the discs on opposite sides of the cloth 25 maintains the same in proper position within the cup-shaped member 15.

Referring more particularly to Figure 3, the cup-shaped member 15ª at the upper end of the stem 13ª is separate from the bowl 16ª, and the lower reduced end of said bowl is provided with threads 30 adapted to be screwed into the threaded walls 31 of the cup-shaped member 15ª. A pair of perforated discs 24 and 27 are located within the cup-shaped member 15ª for maintaining a flannel screen 25 in position. The side walls 26 of the fabric are located between the threaded portions 30 and 31. The lower edge 32 of the bowl 16ª is adapted to engage the disc 27 adjacent its periphery for acting as a nut for locking the discs in position.

Referring more particularly to Figure 4. a bowl 33 is provided having a threaded portion 34 and an inturned annular flange 35 providing an opening 36 in the lower end of the bowl. The upper end of a stem 37 is provided with a lateral flange 38 which supports a pair of perforated glass discs 24 and 27, which maintain a flannel screen 39 in position, and it will be noted that this screen is nothing more than a disc of fabric disposed between the glass discs 24 and 27 and of substantially the same diameter as said discs. A metal cup shaped member 40 is provided with threads 41 at its upper end and a central passage 42 in its base portion to provide a flange 43 upon which is seated the lateral flange 38 on the stem 37. The discs 24 and 27, and the lateral flange 38 of the stem 37 are held in place between the flange 35 on the bowl 33 and the flange 43 on the metal cup-shaped member 40 so that when the lower threaded end of the bowl is screwed in the upper threaded end of the cup-shaped member, the discs and flanges will be locked together.

A handle 50 has a semi-circular extension 51 embracing the gasket 12. A movable clamping element 52 is pivoted at 53 in the slotted portion 54 of the handle 50 and it likewise has a semi-circular portion adapted to also embrace the gasket 12. A resilient catch 55 on the free end of the hinged member 52 is adapted to engage a lug 56 on the extension 51 so that as the pivot member is moved to clamping position it will engage the lug and lock the hinged member 52 to the extension 51. The handle is provided with a thumb piece 57 and a finger piece 58, the finger piece engaging, as shown at 59, the bowl of the percolator.

When the parts of the device are assembled, as shown in Figure 2, a predetermined quantity of ground coffee is placed in the bowl 16 so that it will be deposited on the perforated disc 37 and over the nut 21. The pot 10 is filled with the required quantity of water for the purpose and care is taken that the lower end of the stem 13 is spaced a sufficient distance from the bottom 14 of the pot in order to prevent all of the water from the pot being forced into the bowl 16. Boiling water is placed in the pot and the said pot is then placed on a burner. The pressure of steam and water vapors in the pot 10 causes the water to be forced through the stem, through the discs 24 and 27, and the strainer 25 into the bowl 16. After a few minutes, the pot, together with the bowl are removed from the burner and the water in the bowl 16 is allowed to percolate through the ground coffee and through the discs 24 and 27 and the fabric strainer 25 and then passes back into the pot 10. By means of such construction a clear coffee liquid is produced which is free of grounds and also free of suspended particles of coffee which cause the murky liquid.

It will be appreciated that all the parts which come in contact with the coffee liquor are to be made of non-metal materials in order to insure better flavor and healthful qualities.

What I claim is:—

A coffee percolator comprising a pot having a reduced open end, a bowl having a reduced stem fitted into the open end of the pot, said stem having an enlarged threaded portion at the upper end thereof, a pair of perforated discs located within the threaded portion, a screen located between the discs, and a perforated nut formed of glass and screwed into the threaded portion for securing the disc in flat contact with the screen, said stem providing the sole means for the circulation of liquid between the bowl and the pot.

FREEMAN B. PRICE.